(12) United States Patent
Gregg et al.

(10) Patent No.: US 7,803,450 B2
(45) Date of Patent: Sep. 28, 2010

(54) PRODUCTION OF UHMWPE SHEET MATERIALS

(75) Inventors: Joseph V. Gregg, Ft. Wayne, IN (US); Wesley Allen Kohler, Ossian, IN (US)

(73) Assignee: Quadrant EPP AG, Lenzburg (CH)

( * ) Notice: Subject to any disclaimer, the term of this patent is extended or adjusted under 35 U.S.C. 154(b) by 978 days.

(21) Appl. No.: 11/491,361

(22) Filed: Jul. 21, 2006

(65) Prior Publication Data

US 2008/0020182 A1   Jan. 24, 2008

(51) Int. Cl.
B32B 3/30 (2006.01)

(52) U.S. Cl. .................... 428/167; 428/98; 428/212; 428/409

(58) Field of Classification Search ............. 428/98, 428/156, 500, 167, 212, 409; 264/108, 176.1, 264/210.1, 211.1, 211.21
See application file for complete search history.

(56) References Cited

U.S. PATENT DOCUMENTS

| | | | |
|---|---|---|---|
| 1,902,953 A | 3/1933 | Hazell | |
| 2,965,589 A | 12/1960 | Price | |
| 3,382,535 A | 5/1968 | Ferrari | |
| 3,384,925 A | 5/1968 | Rothemeyer | |
| 3,492,310 A | 1/1970 | Carrow | |
| 3,665,068 A | 5/1972 | Duling et al. | |
| 3,695,575 A | 10/1972 | Hauser | |
| 3,710,988 A | 1/1973 | Moslo | |
| 3,804,567 A | 4/1974 | Recknagel | |
| 3,883,631 A * | 5/1975 | Murray | 264/210.2 |
| 3,887,319 A | 6/1975 | Cottingham | |
| 4,008,035 A | 2/1977 | Korostoff et al. | |
| 4,021,521 A | 5/1977 | Scholl et al. | |
| 4,145,175 A | 3/1979 | Groff et al. | |
| 4,182,606 A | 1/1980 | Gibbon | |
| 4,240,997 A | 12/1980 | Jex | |
| 4,368,022 A | 1/1983 | Orii | |
| 4,781,554 A | 11/1988 | Hendry | |
| 4,797,245 A | 1/1989 | Sonoda | |
| 4,842,507 A | 6/1989 | Kawaguchi et al. | |
| 4,846,614 A | 7/1989 | Steinbock | |
| 4,874,657 A | 10/1989 | Lo et al. | |
| 4,904,318 A | 2/1990 | Goto et al. | |

(Continued)

FOREIGN PATENT DOCUMENTS

DE   4418527 A1   6/1995

(Continued)

OTHER PUBLICATIONS

Tarkow et al., Surface Densification of Wood, Forest Products Journal, 18(a): 104-107.

(Continued)

*Primary Examiner*—Donald Loney
(74) *Attorney, Agent, or Firm*—Brooks Kushman P.C.

(57) ABSTRACT

UHMWPE panels of large width may be prepared by a continuous ram extrusion process by employing a slit die which preferably narrows from both sides in a direction transverse to the machine direction, and/or which employs a plurality of transversely positioned cooling zones located on the top and the bottom of the die, proximate the exit thereof. The panel exits the die at a temperature lower than the crystalline melt temperature.

23 Claims, 4 Drawing Sheets

U.S. PATENT DOCUMENTS

| | | | |
|---|---|---|---|
| 4,933,393 A * | 6/1990 | Toyota et al. | 525/240 |
| 4,938,908 A | 7/1990 | Shiraki et al. | |
| 4,948,543 A | 8/1990 | Pawlowski et al. | |
| 4,952,625 A * | 8/1990 | Shiohara et al. | 524/586 |
| 5,068,073 A | 11/1991 | Pennings et al. | |
| 5,083,889 A | 1/1992 | Steinbock | |
| 5,089,200 A | 2/1992 | Chapman, Jr. et al. | |
| 5,149,193 A | 9/1992 | Faillace | |
| 5,156,790 A | 10/1992 | Cucchisi et al. | |
| 5,234,652 A | 8/1993 | Woodhams et al. | |
| 5,286,576 A | 2/1994 | Srail et al. | |
| 5,399,308 A | 3/1995 | Woodhams et al. | |
| 5,417,561 A | 5/1995 | Shiraki et al. | |
| 5,422,061 A | 6/1995 | Takahashi et al. | |
| 5,449,484 A | 9/1995 | Gusik et al. | |
| 5,474,722 A | 12/1995 | Woodhams | |
| 5,567,368 A | 10/1996 | Ando et al. | |
| 5,874,034 A | 2/1999 | Proper et al. | |
| 5,946,878 A * | 9/1999 | Grund et al. | 52/630 |
| 6,013,217 A | 1/2000 | Hauenstein et al. | |
| 6,103,305 A | 8/2000 | Friedmann et al. | |
| 6,112,396 A | 9/2000 | Steinbock | |
| 6,113,374 A | 9/2000 | Brackman et al. | |
| 6,199,453 B1 | 3/2001 | Steinbock | |
| 6,263,764 B1 | 7/2001 | Steinbock | |
| 6,381,827 B1 | 5/2002 | Steinbock | |
| 6,489,404 B2 | 12/2002 | Bolluijt et al. | |
| 6,652,254 B2 | 11/2003 | Shimura et al. | |
| 6,949,208 B1 | 9/2005 | Kawauchi et al. | |
| 2004/0031793 A1 * | 2/2004 | Garcia | 220/1.5 |
| 2004/0265407 A1 | 12/2004 | Prugh et al. | |
| 2006/0079596 A1 | 4/2006 | Schroeder et al. | |

FOREIGN PATENT DOCUMENTS

| | | |
|---|---|---|
| GB | 1479335 | 7/1977 |
| JP | 60101021 | 6/1985 |
| JP | 8224711 A | 9/1996 |
| WO | 2006041969 A1 | 4/2006 |
| WO | 2008009149 A1 | 1/2008 |
| WO | 2008009150 A1 | 1/2008 |

OTHER PUBLICATIONS

Earl E. Day, "Continuous Extrusion of Recovered Ultra-High Molecular Weight Polyethylene," Chelsea Center for Recycling and Economic Development Technical Research Program, Jan. 2000, Technical Report #16, pp. 1-3.

ArCom Processed Polyethylene, "Resin and Consolidation Issues with UHMWPE". Biomet Inc., Form No. Y-BEM-069/093095/H.

English Abstract for DE 4418527.

English Abstract for JP60101021.

* cited by examiner

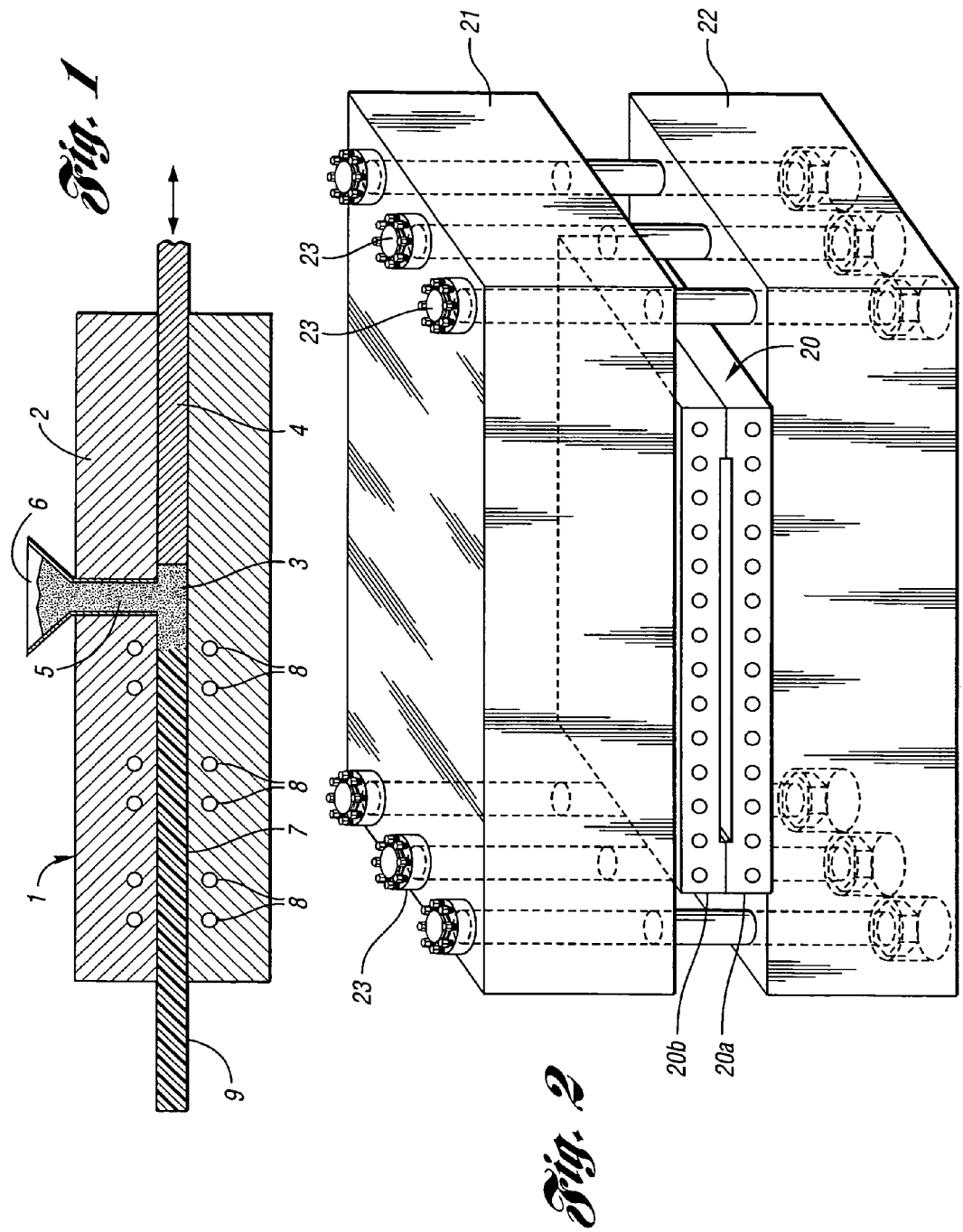

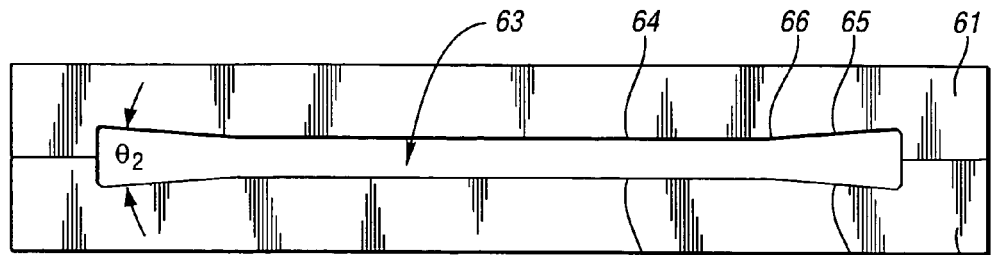
Fig. 6
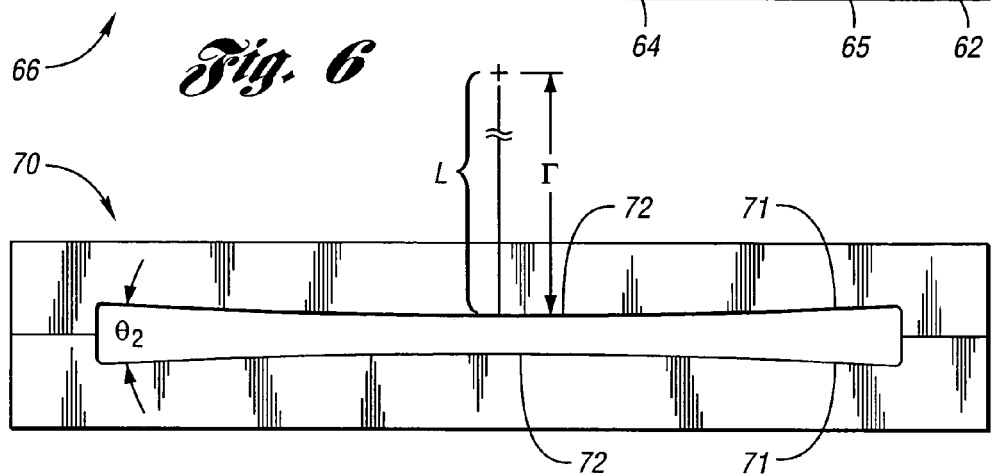
Fig. 7
Fig. 8
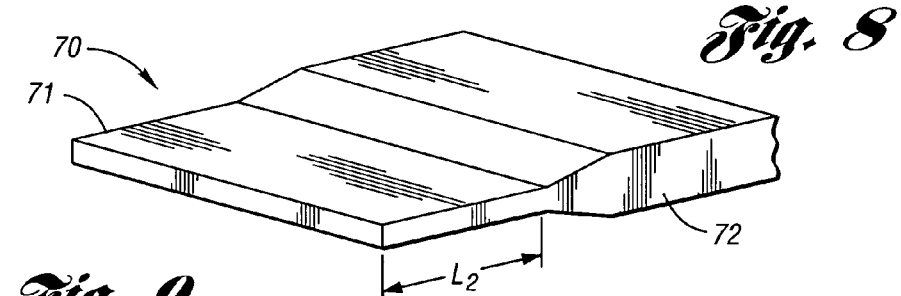
Fig. 9
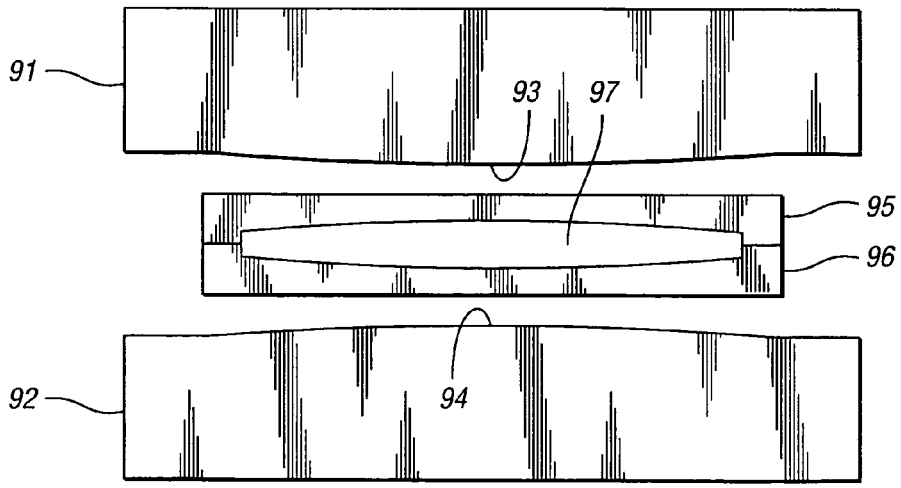

PRODUCTION OF UHMWPE SHEET MATERIALS

BACKGROUND OF THE INVENTION

1. Field of the Invention

The present invention is directed to the production of sheets of ultra high molecular weight polyethylene in widths preferably greater than about 60 cm, by ram extrusion.

2. Background Art

Conventional polyethylene polymers with which many are familiar, i.e. low and high density polyethylene, are waxy solids not known for exceptional strength properties. Also, due to their relative softness, while generally lubricious, they are easily abraded. Ultra high molecular weight polyethylene, "UHMWPE", on the other hand, is an exceptionally strong and durable polymer totally unlike its poorer relatives.

UHMWPE is prepared by special polymerization processes in which the polyethylene chains acquire an exceptionally high molecular weight, typically having number average molecular weights of from $1.5 \times 10^6$ to $1 \times 10^7$ daltons, supplied as a resin powder. UHMWPE also includes those polymers defined in ASTM D4020-05; D6712-01; and ISO 11542-2. While generally homopolymeric in nature, UHMWPE also includes copolymers having limited amounts of other copolymerizable comonomers. In the case of copolymer UHMWPE, the aforementioned ASTM and ISO requirements should be met. It is their very long polymer chains which make these polymers unique. However, this same feature is also the cause of major processing problems. While ordinary polyethylene can be melt extruded, even polyethylene of very high molecular weight, attempts to melt extrude UHMWPE have been largely unsuccessful, despite much research in this area, and virtually all UHMWPE products are produced by compression molding or ram extrusion, as indicated by U.S. Pat. No. 5,286,576, which indicates that processing methods applicable to conventional thermoplastics, such as continuous extrusion, calendaring, and injection molding, are generally inapplicable to UHMWPE.

Thus, for example, U.S. Pat. No. 5,422,061 discloses the manufacture of sliding members by screw extrusion of UHMWPE from the melt. However, for the process to work, mixtures of UHMWPE, lower molecular weight polyethylene ("PE"), and lubricants must be employed. Considerable loss in mechanical properties thus results due to the dilution of the UHMWPE with lower molecular weight species. Further losses in properties are caused by shear degradation in the extruder.

U.S. Pat. No. 5,399,308 discloses melt extrusion through a die whose final cross-section is considerably reduced as compared with the diameter of the extruder, and wherein a very low elongational velocity gradient is maintained. However, despite these requirements, only very high molecular weight PE and UHMWPE in the lowest molecular weight range, about $1.5 \times 10^6$, are useful. U.S. Pat. No. 5,449,484 discloses a screw geometry for a single screw extruder said to be useable with PE resins having molecular weights greater than $1 \times 10^6$. However, large profiles cannot be made using such a melt extrusion process.

The problems associated with processing of UHMWPE are due in part to the gel-like nature of the polymer above its crystalline melt temperature, roughly 135° C.-150° C. While ordinary polyethylene is a viscous, molasses-consistency liquid at such temperatures, UHMWPE is a swollen gel which has an extremely high viscosity, and which exerts exceptional frictional stress against the walls of extruders and the like. The problems associated with UHMWPE are described quite clearly by U.S. Pat. Nos. 3,883,631 and 3,887,319. For the reasons discussed therein, ram extrusion and compression molding have thus far been the only processes of producing UHMWPE products which are used extensively.

In compression molding, UHMWPE powder is introduced into a coffin-like mold of very thick section. A thick cover which fits within the mold cavity is then placed on top of the powder, and the whole assembly is heated to above the crystalline melt temperature while being compressed to very high pressure. The molds are then slowly and uniformly cooled, and the product, generally in the form of a thick slab, is demolded. For thin stock, for example of 1 cm to 3 cm thickness, the thick slabs are skived or "planed" to produce thin stock. The skiving process requires an extra process step, and can result in a product with end curl. As can be seen, compression molding is a cost-intensive and labor intensive method of producing UHMWPE products. However, it is essentially the only process which can be used to make panels or sheets of large width, and is thus still a much used process.

A continuous process for the production of thin gauge UHMWPE sheet has been used by Crown Plastics, Harrison, Ohio, U.S.A. In this process a roller belt press previously manufactured by Hoover Ball and Bearing Co. as the Lam-N-Hard laminator, and as described for use in wood lamination by Tarkow, et al., "Surface Densification of Wood," FOREST PRODUCTS JOURNAL, 18(a): 104-107, is used to consolidate UHMWPE powder. However, the process thus far has been limited to thin sheets with a maximum thickness of 3-4 mm and relatively narrow widths. Only recently has a 24 inch wide (0.6 m) sheet been produced by this method, and it is not believed to be possible to produce wider sheets due to the high pressures involved.

Ram extrusion is a unique process which is considerably different from melt extrusion. Ram extrusion may be illustrated with reference to U.S. Pat. Nos. 3,883,631; 3,887,319; and 4,145,175. Despite the fact that the ram extrusion technology disclosed in these references is more than 25 years old, there has been only incremental change in ram extrusion processes since that time.

The overall process may be described in relation to FIG. 1 which shows schematically, in cross-section, a simple ram extrusion machine for production of a UHMWPE rod. The ram extrusion machine consists of very thick section steel member 2 having a through channel 3 into one end of which is received ram 4. UHMWPE powder 5 flows gravitationally into channel 3 from hopper 6. The ram then travels to the left, compressing the powder in the channel, which is now die channel 7. This sequence is repeated every few minutes. Die channel 7 is heated by heaters 8 which surround the die, and heats the resin particles to a relatively high temperature, for example between 350° F. and 500° F. (177° C. and 260° C.). Temperatures in excess of 500° F. (260° C.) are generally avoided, since the polymer rapidly oxidizes above this temperature. Oxidized polymer exerts yet more friction with the die, and due to the oxidation, products have reduced physical characteristics. The ram exerts a pressure up to several thousand lb/in$^2$, and consolidates the heated, gel-like particles of UHMWPE. The UHMWPE rod 9 exits the die at discrete intervals and at this stage the rod is hot, higher than the crystalline melt temperature, and relatively translucent. However, at some distance from the die face, the polymer has crystallized to an opaque solid.

Ram extrusion has been used to produce round profiles of relatively large diameter, e.g. 300 mm, and also tubing, small profiles of complex shape, and "boards" having a width of up to about 660 mm, and thicknesses of, e.g. 100 mm. However, such boards are far from flat as produced. If flat boards or thin stock is needed, the boards are skived. Because of the high friction within the die, and consequently the very high pressures involved, the ram, even though made of very high strength steel, may buckle. This is particularly so in parts whose cross-section is quite asymmetric, and even more so in parts having a substantially rectangular cross-section of high aspect ratio. For example, a ram for producing a board of 1 cm×30 cm rectangular cross-section may exhibit buckling, whereas a ram for a thicker board, for example 10 cm×30 cm, will have virtually no problem in this respect at all. Not only can buckling be destructive of the ram, but the distorted ram may scrape the die walls, introducing metal particles into the product and altering die geometry.

It would be highly desirable to employ ram extrusion to produce sheets and panels of large width, for example 1 to 3 meters in width, and of a range of thicknesses, in particular, in standard thicknesses which can be sold as is, without skiving. However, attempts to use the ram extrusion process to prepare such sheets and panels meeting the necessary product standards have been largely futile. The failure of others in the past can be attributed to a number of factors. First, the nature of UHMWPE is such that there is considerable volume contraction upon both cooling and crystallization. Differential cooling or crystallization generates internal stress, as does also differing degrees of polymer orientation. In small profiles or even larger products which are relatively symmetrical, these problems are minimal, or are to a degree self-cancelling. However, in large widths, these problems manifest themselves as undesirable "product characteristics" such as thickness variations, bowing, warping, surface fracture, surface irregularities, "walking", edge waviness, etc. The larger the width of the product, the more difficult is the control of such defects.

Moreover, the ram extrusion apparatus itself also has severe shortcomings. The large top and bottom surface areas associated with a slit die, coupled with the large internal pressure, create forces which are very difficult to control. A slit die of 1 cm height and 1 m width, and of 0.5 m length may experience a force of $2.1 \cdot 10^6$ N or more on each half of the die depending upon the internal pressure, which is always high. The restraining bolts in this case will have to bear almost $4.4 \cdot 10^6$ N of force. Even when such a die is constructed of high strength stainless steel of, for example, a 10 cm thickness on each side, the die will deflect so much due to the internal pressure that a board with pronounced greater thickness in the middle as opposed to the edges results. Dies of this size and construction will also rupture, unless supported by massive restraining structures located exterior to the die.

Unlike symmetrical profiles such as rods, tubes, square stock, or small irregular profiles, the large surface area and high aspect ratio of sheets and panels causes them to distort upon cooling below the crystalline melt temperature external to the die. Differences in the rate of cooling and crystallization can cause warping, bowing, thickness and surface irregularities, and the like. Such defects would then require minimally, shaving of the surface and machining to size. However, some defects, for example warp and bow, may be impossible to remove.

For all the above reasons, it has been considered impossible to produce wide sheets and panels of a quality which is commercially acceptable, by ram extrusion.

SUMMARY OF THE INVENTION

It has now been surprisingly discovered that flat panels of UHWMPE in widths greater than 0.6 m and of substantially constant thickness can be produced by ram extrusion through a slit die as a partially crystalline solid, the slit die provided with a plurality of transversely positioned cooling zones on both the top and bottom of the die proximate the exit of the die. It has further been surprisingly discovered that a higher quality, flatter product is obtained if a die is provided which is sandwiched by a support structure, the die having a slit of non-uniform height when not under pressure, but in cooperation with flexure of the die and support structure under ram extrusion pressure, is distorted so as to provide a substantially flat product. Preferably, the die as described is used in conjunction with the multiple cooling zones to provide a stable and robust process.

BRIEF DESCRIPTION OF THE DRAWINGS

FIG. 1 illustrates schematically the process of ram extrusion.

FIG. 2 is a perspective drawing of a die and support structure for one embodiment of a ram extrusion machine suitable for producing wide panels.

FIG. 6 is a further embodiment of a subject invention die from the downstream direction.

FIG. 7 is a further embodiment of a subject invention die from the downstream direction.

FIG. 8 illustrates one embodiment of a ram suitable for use in the present invention.

FIG. 9 illustrates a further embodiment of a slit die and window frame restraint suitable for use in the present invention.

DETAILED DESCRIPTION OF THE PREFERRED EMBODIMENT(S)

Figure 3:
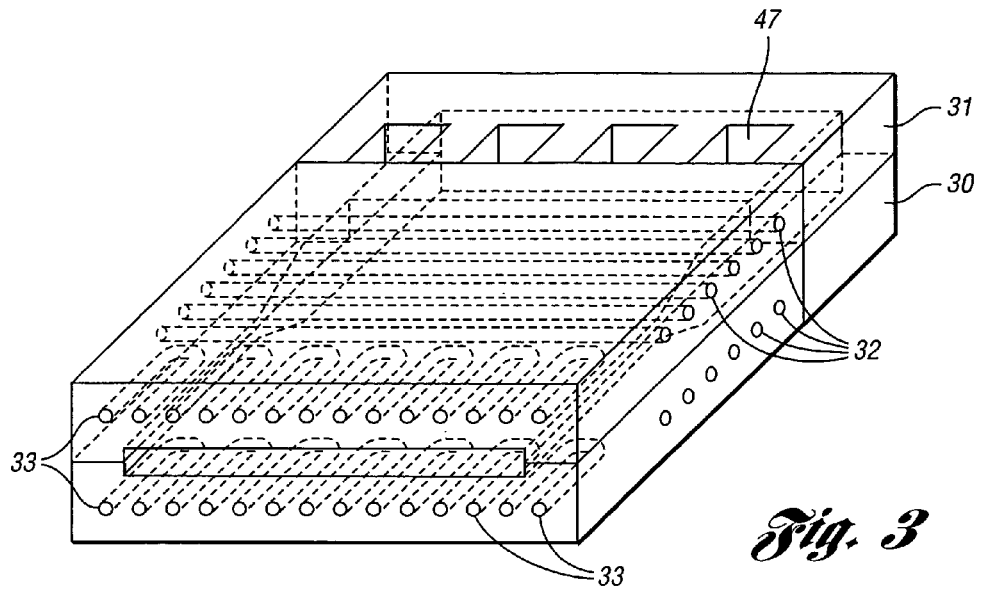
FIG. 3 is a perspective view of one embodiment of a slit die of the subject invention, showing the heating and cooling zones.

The ram extrusion process employed by the subject invention upstream from the die is substantially that described in U.S. Pat. Nos. 3,887,319, 3,883,631, and 4,145,175, herein incorporated by reference.

The present invention pertains to the ram extrusion of panels of high width and aspect ratio, as described hereinafter. The term "panel" refers to a substantially flat extrusion. Typically, the sharp corners of the nominally rectangular cross-section may be rounded, and indeed, the entire edge portions may be circular, elliptical, etc. A purely rectangular cross-section with sharp corners is generally not desirable due to stress points in the die at such corners. The principle utility of the subject invention is to produce large width sheets of constant thickness, this constant thickness extending to a position at or proximate the edge. Thus, by the definition of "panel" as used herein is meant a generally flat sheet of less than ±0.050 inch (±1.27 mm) thickness variation over a central portion of the panel which includes at least about 80% of the overall panel width, preferably at least 90% of the panel width, and most preferably 95% or more of the overall panel width. Thus, it would not depart from the spirit of the invention to produce a sheet having a "dumbbell" or other cross-section, with edge portions significantly thicker or thinner than the majority of the panel. These portions can easily be removed, preferably by the manufacturer but also by the end user, by conventional sawing or slicing steps.

Because of its large width and of its asymmetry due to the high width to thickness aspect ratio, the production of wide panels from a substantially rectangular die, i.e. a die with substantially parallel surfaces across its width, is very problematic, and many attempts to do so have failed. Unlike many smaller products which are ram extruded at exit temperatures above the crystalline melt temperature, panels of large width, upon initiation of crystallization, will distort in unpredictable ways due to the volume contraction which occurs during crystallization as well as internal stresses which are created. However, allowing full solidification prior to exit from the die is generally not practiced due to loss of contact with the die walls. If the die walls are progressively narrowed toward the exit, contact can be maintained, but the buildup of pressure can at times be so high as to separate the die halves, or even to rupture the die or its support.

The UHMWPE panels of the present invention are partially crystalline as a result of exiting the slit die of the ram extrusion apparatus at a temperature below the crystalline melt temperature. While for thin gauge panels, i.e., those having thicknesses of 1.5-2 cm or less, the entire panel temperature (e.g., throughout its thickness) may be less than the crystalline melt temperature, for thicker panels especially, the interior of the panel may be at a higher temperature. Thus, it is not necessary that the entire panel be at such a low temperature, provided that the surface of the panel, and preferably the panel interior to a depth of about 3 mm, is below the crystalline melt temperature. To further reduce the interior temperature of thick panels, the rate of extrusion can be slowed, thus spending more time in the cooling zone; the cooling zone may be extended; or the temperature of the cooling fluid can be lowered. These methods may be employed singly or in any combination.

Applicants have surprisingly discovered a means of providing a solidified product without loss of die contact, while minimizing any pressure excursions. The process employs a back pressure device, and is the subject of a copending application entitled "Process For Ram Extrusion Of UHMWPE Sheet Products", filed on even date herewith. However, despite the use of a back pressure device, Applicants have found that it is very difficult to keep the process running in a stable manner, i.e. defined as producing a flat, commercially acceptable product with a small reject rate.

Applicants believe that the non-robust nature of such processes is due to the same factors which destroy product uniformity of amorphous panels during cooling and crystallization, but in this case the irregularities are exhibited within the die as opposed to outside the die. Applicants have surprisingly discovered that a robust process can be provided if a plurality of three or more cooling zones are located proximate the exit face of the die distributed in the width direction, on both the top and bottom die halves, or in a monolithic die, above and below the die slit. The plurality of cooling zones are preferably arranged symmetrically on either the top half, the bottom half, or both, about a centerline of the die. Most preferably 5-10 cooling zones or more are utilized on both the top and bottom, greater numbers being advantageous with increasing panel width. Thus far, for sheets of approximately 1 m to 1.2 in width, 5 to 7 zones of substantially equal size, as shown in FIG. 2 are preferably used. The top and bottom die halves need not have the same number of cooling zones, but this is preferred.

A plurality of cooling zones are independently controlled. Each cooling zone is preferably independently controlled, although in a given installation it may be found that two or more zones may be controlled together. Experience has shown, however, that independent control is highly desirable and in most cases necessary. Each cooling zone preferably has its own inlet and outlet, although outlets may be shared in parallel with adjacent zones in suitable designs. Series connection of all zones will not work. The zones are fed cooling fluid, which may be gas or liquid, but is highly preferred to be liquid, due to the high heat removal demands. Cooling liquid may be water, although glycols or other heat transfer fluids may be used. Water is preferable, and a closed system with cooling means which assures uniform water temperature is desirable. The temperature in a given zone is measured by a suitable measuring means, preferably by a thermocouple positioned in the die proximate the zone, and the flow and or temperature of coolant is regulated by conventional process controls. Preferably, proportional valving rather than on/off valving is employed, and temperature regulation is preferably adjusted by varying the rate of coolant flow rather than adjusting the coolant temperature. Temperature may also be adjusted by providing sufficient cooling to provide a lower than desired temperature, and then elevating the temperature to the desired temperature by electrical heating. This is not preferred. Temperature in each cooling zone is preferably regulated between ±3° F. (1.7° C.) of the set point, more preferably ±1° F. (0.6° C.).

The temperatures of the individual zones are adjusted to provide a flat product. In one machine embodiment, the cooling zones positioned across one of the die halves will be at the same temperature for the majority of the machine operation, and the cooling zones in the lower die half will be at a uniform temperature relative to each other, but at a temperature different from the temperature of the upper die half cooling zones. Depending in part upon the length of the cooling zone in the machine direction, the temperature of the individual zones may range from 80° F. (27° C.) to 200° F. (93° C.), preferably from 90° F. (32° C.) to 180° F. (82° C.). The bottom cooling zones are in general maintained at a lower temperature than those on the top, i.e. different by about 1° F. to 25° F. (0.6° C. to 14° C.), in general about 3° F. to 15° F. (1.7° C. to 8.3° C.). It has been surprisingly discovered that the lower temperatures produce sheets with shot marks of relatively low height. The multiple transverse cooling zones can also be used with dies designed to extrude narrower panels, for example of 0.4 m width.

The machine operator, observing the panels exiting the machine, will adjust the cooling zone temperature individually if warpage or surface imperfections are noted. For example, if the panel warps or curls in an upward direction on the far right side, the top and bottom zones corresponding to the position of the warpage will be adjusted by making the top zone colder or the bottom zone warmer, or both. In general, it is desirable to have the temperature of a given zone as close as possible to adjoining zones to minimize uneven cooling. In like fashion, if the entire sheet bows uniformly, i.e. "curls", then the temperature differential between the top and bottom zones is adjusted to remove the bow. Only minimal training of the operator is required to maintain stable operation.

The process can also be easily implemented as an automatic process in hardware and/or software, for example, by scanning the panel transversely at one or more positions along its length by means of an optical comparator or the like, or feel gauges, etc., which detect warpage or bowing, and make corrections automatically. It should be noted that due to the nature of the problems associated with ram extrusion of high aspect ratio panels, numerous factors will cause instability, for example, fluctuations in coolant temperature, raw material batch changes, etc, and even the opening of a door to the operating environment. Further information regarding the cooling zones will be presented in the Examples.

The panels of the subject invention should be flat, i.e. free from warp and bowing, and also of uniform thickness, preferably ±0.030 inch (0.76 mm). The cross-section is thus substantially rectangular. However, the sides of the panels are generally rounded at least at the corners, since such rounding lowers the pressure in the die and also eliminates sharp die corners, which would then be points of stress which could crack at the high pressures involved. By "substantially rectangular" is meant a generally flat sheet when viewed from the end, with perpendicular, curved, or radiused sides, and parallel or substantially parallel main surfaces. Likewise, a rectangular die slit is one which has two faces having a length equal to the width of the panel to be produced, whose faces are flat and parallel to each other under extrusion pressure, the faces connected by sides which are preferably rounded or radiused. It is the flatness of the panels, and of the die faces which produce a substantially flat panel, which satisfy the definition of "substantially rectangular" herein.

It has been found, however, that if a die of substantially rectangular geometry when not under operating pressure is employed as a die in the extrusion of large width panels, the resulting panels do not have uniform thickness, have numerous surface irregularities, and in general produce a commercially inferior and generally unacceptable product. For most applications, such products have to be surface machined or skived to produce a flat surface. This process is wasteful of expensive polymer and adds further process steps, which further increases cost.

It has been found that it is advantageous to utilize a die which is manufactured with a shape which is other than substantially rectangular, in particular a shape in which the edge region of the top and bottom surfaces of the die slit are not flat and parallel to each other, in conjunction with a support structure which, like the die, distorts under stress, the die and support structure coacting such that distortion of the non-rectangular die under operating pressure transforms the die opening into an opening such that a flat product is produced. In a further embodiment, the die and support structure are merged into one, by employing massive die top and bottom halves. Such a massive die is not preferred, due to its cost.

The preferred die geometry is one in which the most central portion of the die is of lesser height than edge regions of the die. When the die expands against the support structure, the edge regions of the die will distort the least, while the central area, and the support structure above and below the central area, will distort more, bringing the faces of the die to a substantially parallel geometry. For the purposes of this invention, a die will have substantially parallel geometry if, during operation, a panel which has thickness variations over its width of less than 0.050 inch (1.27 mm) is produced. Applicants have discovered that a high quality panel of large width may be produced by employing a die which preferably has a dual taper, and one in which the die is cooled proximate the exit such that the panel exits the die at a temperature below the crystalline melt temperature.

The dual tapers of a preferred embodiment of the subject invention die may be divided conceptually into a vertical taper and a transverse taper. The vertical taper is a narrowing of the die proximate its inlet end as viewed from the side, i.e. a narrowing in a vertical direction. The transverse taper is a narrowing of the height of the die slit in a direction transverse to the machine direction, i.e. across the width of the continuously produced panel stock.

Figure 4:
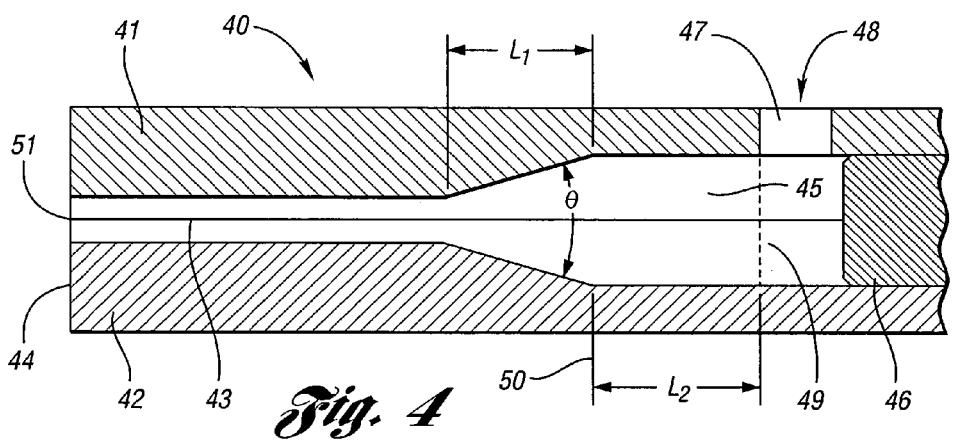
FIG. 4 is a cutaway view of one embodiment of a die from the side, showing the vertical taper in exaggerated form.

The vertical taper is more clearly shown by reference to FIG. 4. The die 40 is preferably machined from stainless steel in two parts 41 and 42. The die slit 43 is of substantially constant height in the machine direction, up to the vertical taper, although it is possible to provide an additional narrow taper to the die in the hot zones of the die. Thus, instead of a necessary single vertical taper, there may be multiple vertical tapers, or a taper of progressively changing slope, the die walls becoming substantially parallel prior to the die exit face 44, and prior to or proximate the cooling zone. The area 45 is the ram entrance area, and has substantially constant height to accommodate ram 46. Opening 47 allows UHMWPE powder 48 to be introduced into cavity 49. The ram advances toward the die exit face 44 and stops at point 50, thus compacting the resin powder over a length $L_2$. The vertical taper starts at point 50, although it may also start later, i.e. further toward the die exit face 44. The taper, unlike those taught by the prior art for use in manufacturing small profiles, is quite minimal, the included angle θ, preferably being less than 10° altogether, more preferably less than 5°, and most preferably between 1° and 3°. The taper may be symmetrical about the centerline 51 of the die, or may be asymmetric to the extent that all the taper is expressed in one of the die halves. Preferably, the taper is evenly divided between the die halves, and is somewhat less than 3° in total. The taper extends over length $L_1$. This length is determined by the angle of the taper and the ratio of the height of the entrance ram channel and the nominal height of the exit slit of the die. In a die for producing panel stock of nominal 0.375 inch or about 1 cm thickness, the length of the vertical taper is preferably about 3 inches (7.5 cm). If the length of this taper is too long, or extends substantially into the cooler zones of the die, the well known incompressibility of UHMWPE will tend to force the die halves apart to an even greater extent than that due to normal internal pressure.

Figure 5:
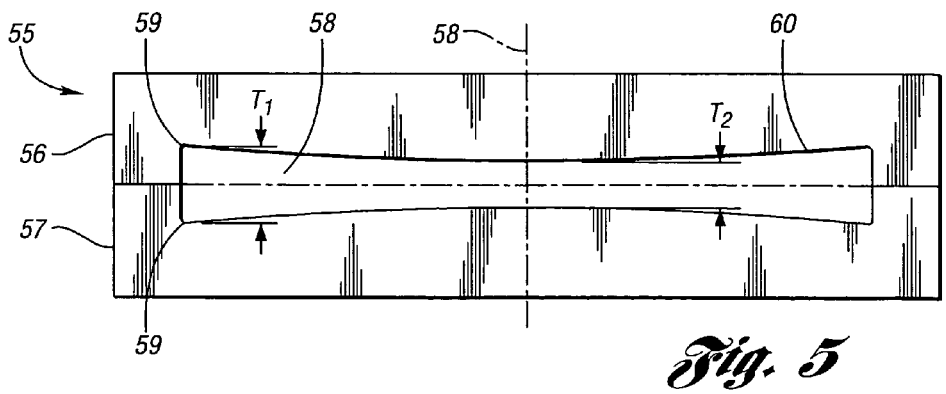
FIG. 5 is a view of one embodiment of a die from the downstream direction.

FIG. 5 illustrates one embodiment of the exit face of a subject invention die. In this embodiment, the die slit becomes increasingly narrow as one progresses toward the centerline 58 of the transverse direction. The die 55, again, is shown prepared in two pieces 56 and 57. At the edge of the die slit 58, the height $T_1$ is substantially the same as the nominal thickness of the panel to be produced, but is generally slightly greater than the panel following exit from the die. The corners are preferably chamfered or radiused e.g. at 59, to relieve stress and minimize friction. At the centerline of the die, the height $T_2$ is less than $T_1$. For a panel of a width of nominally 1.2 m the difference $T_1-T_2$ is approximately 0.05 mm to 0.5 mm depending upon the deflection of the die and its support structure, more preferably around 0.3 mm. The shape of the die surface which contacts the UHMWPE may expediently be a conic section, at least in part. Examples of such conic sections are parabolae, hyperbolae, oblate and prolate ellipses, circles, etc. It should be noted that unless otherwise indicated, a "curvature" includes a curve of infinite radius, i.e. a straight line.

If T is the height at the edge of the die exit slit, the height at other portions of the die may be roughly established by Te and Tm where Te is the height at a distance De from the cavity edge, where De is 9 inches (22.5 cm) or less, and Tm is the height of the cavity at a distance Dm from the cavity edge where Dm>9 inches (22.5 cm). The values of Te and Tm for dies of nominally 1.2 m width is then given by $$Te = T_1 - 0.00275\, De \text{ and}$$

$$Tm = T_1 - [0.00275\, De - (0.00175(Dm-De))]$$

The constants 0.00275 and 0.00175 are related to the thickness of the die (not the cavity height), the thickness of any supporting structures, the width of the die, etc. Due to the complex nature of the process and the intricacies of the die, etc. per se, for example the cooling passages, die length, die transition zone, etc.; for dies of appreciably different dimensions, different constants and different limiting values of De and Dm must be determined. Resort may be had to techniques such as finite element analysis, for example, software for which is readily available. However, it may be more expedient to machine the die by trial and error, with the material removal being conservative, such that the final shape is approached by successive refinements without having to begin the machining process again.

The difference $T_1-T_2$ may be determined empirically by production of a die having a small and preferably inadequate value of $T_1-T_2$, performing a trial ram extrusion, and measuring the differences in thickness of the panel produced in a direction transverse to the machine direction. If significant differences in thickness or surface irregularities are noted, the die can then be machined to produce a greater height variance in the slit. It should be noted that the most advantageous shape of the die surface 60 is not necessarily circular, but may indeed be parabolic, hyperbolic, ellipsoidal, etc., and may in fact, as later discussed, be multiply tapered.

It has been found through a great deal of effort, that the shape of the die slit and the value of $T_2-T_1$ is dependent on several factors which together define the requisite geometry. By the latter term is meant a die slit shape which, in conjunction with the operating parameters of the machine, e.g. resin type, temperature, internal pressure, length (machine direction) of die, width (transverse) of die, preferably produce a panel product with a thickness variation across the width of the panel of less than 0.050 inch (1.27 mm), more preferably less than 0.030 inch (0.76 mm), and most preferably less than 0.020 inch (0.51 mm). Since these values are total thickness variation, the surface height fluctuations are generally ±half these values, i.e. preferably ±0.010 inch (0.25 mm) or less.

The parameters which are most important in determining the transverse slit taper are: the internal pressure; the width of the panel; and the deflection of the support structure restraining means preferably used. As the width of the panel increases, the force exerted on the two mold halves, at any given pressure, increases also. This pressure will tend to force the mold halves apart, and in prior machines, has literally done so. The die halves of the preferred embodiment of the subject invention machines are about 11-12 cm in thickness. If these die halves were unsupported on their exterior, they would bend so much in producing a 1 cm thick panel 1.2 m wide that they would buckle and break. It would be possible, of course, to make the die halves of much thicker material. However, stainless steel is expensive, and even were the die halves 25 cm thick, bending would still be severe. A preferred material for the dies is T420 stainless steel, preferably polished and coated with a wear resistant and preferably lubricious coating. Conversion coatings, and preferably metal coatings, such as hard chrome or nickel may be used. Advantageously, diamond-like carbon (DLC) coatings such as supplied by Diamonex Products, Allentown, Pa. as Diamonex® DLC or amorphous diamond coatings such as are disclosed in U.S. Pat. No. 6,103,305, herein incorporated by reference, are used. Such diamond coatings are well known for their low coefficients of friction. Peripheral die components can be made of hardened steel, for example PHS 4140 prehardened steel.

The degree of distortion of the die along the direction transverse to the machine direction is dependent upon the width of the panel being produced. The greater the panel width, the greater the internal die surface area and the greater the force exerted on the die halves. Moreover, transverse to the machine direction, the distortion may be viewed as a force moment distant from the securing devices uniting the die halves. For example, in a two piece die secured on its flanks by a series of bolts or similar devices, distortion will be greater the further from the securing devices. Thus, the die will distort somewhat more in the middle than at the edges. Moreover, the force on the securing bolts will receive a much greater contribution from the central area of the die than from the edges of the die.

To decrease the distortion of the die, a "window frame" support structure is preferably used with the dies of the present invention. The "window frame" consists of massive supports above and below the dies, these supports having a high modulus. Preferably, the supports are made of carbon steel, for example Viscount®-44 steel. The supports are shown in FIG. 2 as 21 and 22 above and below the die 20. These, together with connecting bolts 23 which are located on both sides of the structure, form a "frame" about the die halves 20a and 20b, keeping them in compression. In a preferred machine, the upper 21 and 22 lower supports are about 40 cm thick or of greater thickness, and about ¾ as long as the die in the machine direction. They are wider than the die halves by some 10-15 cm on each side so that massive bolts may be used to tension all together. Despite the massiveness (ca. 3 tons of steel each) of the supports, deflection is still observed. However, the more massive the support the less the deflection. A plurality of individual supports rather than a single support may also be used.

Thus, for relatively "narrow" panels of 0.6 to 1 m, by using supports of exceptionally heavy section, for example 1 m in thickness, or by reverse beveling the supports to counter distortion, the die slit may have minimal transverse taper or even no taper. However, such massive supports are generally undesirable, as they not only increase machine cost, but engender a severe weight penalty as well, thus requiring a stronger and hence more massive base, i.e. floor, to support the weight.

FIG. 6 is an alternative embodiment which is particularly useful for panels less than 1.2 m in width. In FIG. 6, where the tapers are exaggerated for clarity, the die 60 is again of two parts, 61 and 62. The slit 63 has a flat section 64 in each die half, and tapered sections 65, which taper at a very low included angle $\theta_2$. This included angle is generally much less than 0.5°, and is preferably around 0.1°. A taper of 0.05° in each mold half, for example, may be satisfactory. The junction 66 between flat section and taper may be smoothed or radiused. The taper, transition between tapered portion and flat portion, and length of flat portion, are adjusted such that a flat panel is produced.

FIG. 7 illustrates a preferred embodiment of the present invention, which combines the features of both FIG. 5 and FIG. 6. In FIG. 7, the die 70 for a panel of approximately 1.2 m width and 1 cm thickness, has side tapers 71 as in FIG. 6, preferably extending inwards from the edge of the die for about 10-40 cm, preferably 20-30 cm, at an angle $\theta_2$ of preferably between 0.02° and 0.1°, most preferably about 0.06°. The central portion 72 of the die faces, rather than being straight, is curved inwardly ("convex"), towards the horizontal centerline of the die, with a long radius L, for example of 200 m to 1000 m, preferably 250 m to 500 m. The central portion of the die is convex on each face, and has a radius preferably of 1000/2W where W is the width of the exit slit in meters. Coupled with a window frame support of a thickness of about 40 cm, it has been surprisingly found that these relatively non-planar die surfaces, with a dual taper (side taper plus central curvature), do not result in a product of tapered thickness, but rather produce a flat panel product of highly uniform thickness and excellent surface quality.

In a further embodiment, the slit die is machined to have a straight, non-tapered main section, or even one with a reverse taper, i.e. with greater height in the middle than at the edges, but is used with contoured window frame supports, as shown in FIG. 9, where again the contours are exaggerated for clarity. Supports, 91, 92 have inwardly tapered surfaces 93, 94 which, when assembled bearing on die halves 95, 96, will distort slit 97 such that the shape is not substantially rectangular, but is more similar to the shapes of FIGS. 5 and 6. Thus, when assembled, the die will not be substantially rectangular. Under operation, however, the pressure in the mold will attempt to force the die halves apart, the support structure surface abutting the die will bend upwards centered about the middle of the support, and the slit will bow outwards and distort to near net shape, i.e to a shape which produces a panel product of substantially rectangular cross-section.

Thus, with respect to the die geometry, the shape of the slit is such so as to provide substantially planar top and bottom surfaces of the product panel when under load, i.e. at the high operating pressure of the ram extrusion process. This achievement is accomplished by providing a contoured mold which distorts to the desired shape under load; a non-contoured mold with a contoured and distortable window frame, or a non-contoured mold with a massive and substantially non-distortable window frame. For a die of ca. 1.2 m width and ca. 1 cm exit slit height, the supports above and below the die will have to be about 0.75 m thick for the latter embodiment. Preferred dies also have the vertical taper previously described.

The rams used in producing the panels of the subject invention are stepped rams, as illustrated in FIG. 8, preferably made of high strength steel such as Viscount®-44 steel. The end 71 of the ram 70 which penetrates into cavity 45 of FIG. 4 has a thickness of just slightly less than the thickness of the cavity, and a length approximately $L_2$ (see, FIG. 4). The ram is preferably hydraulically operated by one or more hydraulic cylinders, and enters the die through a seal, for example of polyamide. The foregoing attributes of the ram are typical of rams used in ram extrusion of conventional shapes. From the narrow end 71 toward the hydraulics (at the right, not shown), the thickness of the ram increases significantly to a much thicker section 72. This thicker section reduces the flexure and any tendency to buckle which would otherwise occur. The thickness of the ram portion 72 may be 7 cm, for example, while the "tongue" 71 may be 1 cm. Note that the tongue of the ram, in the case of the preferred embodiment, is only slightly thicker than the die thickness at the exit end, by a factor corresponding to the vertical taper of the die. It is also possible to employ rams having a tongue of the same thickness as the die exit, but this is not preferred, except perhaps in panels of greater thickness, e.g. 4 cm, preferably 10 cm or more.

The die contains at least one heated and one cooled section relative to the machine direction. One heated section is proximate the portion of the die where the ram enters the die, although it may also be advantageous to establish a cooling zone between the ram entry point or cavity 45 of FIG. 4 and the heating zone, to minimize the sintering of resin powder near the powder inlet. The heating zone preferably begins about 6 inches (15 cm) prior to the start of the vertical taper and continues for a length in the machine direction such that full consolidation of UHMWPE occurs. This length will vary inversely with the temperature established in the heated zone, the "hot zone", and directly with the thickness of the panel. Neither of these inverse and direct variables are necessarily linear. Thicker panels require a longer period at a given temperature to consolidate the interior of the panel. The temperature in the hot zone is preferably from 260° F. (127° C.) to 500° F. (260° C.), more preferably 400-450° F. (204-232° C.), most preferably about 420° F. (216° C.). Temperatures higher than 500° F. (260° C.) will tend to cause oxidative degradation of the resin, and are not desired. The hot zone may be divided into several subzones of varying temperatures. Temperatures are sensed by conventional devices, preferably by thermocouples interfacing with automatic temperature control devices. Heating is most preferably accomplished by cartridge heaters inserted transversely into the die.

A plurality of such heating zones is shown in the perspective drawing of a slit die in FIG. 3. Both die halves 30 and 31 have a plurality of passages 32 bored through the die transverse to the machine direction. These passages may contain cartridge-type resistance heaters, or may use hot oil, etc., as a heating fluid.

The cooling section is preferably located proximate the exit of the die, and consists of a plurality of cooling passages 33, each having an inlet and an outlet. Other arrangements of cooling zones, for example a plurality of inlets bored parallel to the machine direction and communicating with one or more common outlets bored transversely to the machine direction are also possible. The arrangement itself is not critical. However, whatever the arrangement, the cooling zones must allow for temperature variation to be established as desired transverse to the die slit, for example to maintain the central area of the slit at a higher or lower temperature than the edge regions, or intermediate zones.

It is highly beneficial to the operation of the present ram extrusion process to minimize the build-up of pressure within the die. Good temperature control is a necessary requirement for producing a consistent product, but increasing temperature does not have a great effect in lowering operating pressure since UHMWPE is gel-like and rubbery, rather than a viscous fluid. It has been discovered that addition of small amounts of long chain fatty acids and fatty acid salts such as stearic acid, palmitic acid, linolenic acid, and their salts, particularly their calcium and zinc salts, aid in lowering internal pressure, presumably by lowering friction of the gel particles with the die walls. Other lubricants such as montan esters, amides, polyethylene waxes, silicone oils, and the like are also suitable. Such lubricants are generally used in amounts of from 0.1 to 3% by weight, more preferably 0.2 to 2% by weight, most preferably 0.5 to 1.5% by weight. It is important, however, to minimize the amount of lubricant to avoid loss of mechanical properties. Thus it is preferable that 1.5% or less be employed.

It has also been surprisingly discovered that minimizing oxygen content of the resin powder during the process greatly lowers operating pressure. Typically in ram extrusion, resin powder is pneumatically directed to a supply hopper above the ram extrusion machine by air. It has been found that if an oxygen-free gas is injected into the hopper, preferably at or near the bottom, to sweep or "sparge" air out of the hopper, that the pressure in the die is lowered by 150 to 200 lb/in², a very surprising amount. This reduction in pressure may result in lowering the force exerted against the die halves by as much as $1.5 \times 10^4$ lbs pressure in a 1 m×0.5 m die. Any oxygen-free or oxygen-depleted gas may be used, including helium, argon, carbon dioxide, nitrogen, or the like.

The UHMWPEs employed in the process are conventional powdery resins, as supplied by Ticona, Braskem, and DSM, for example. Preferred number average molecular weight ranges are between $2 \cdot 10^6$ Da and $10 \cdot 10^6$ Da, more preferably between $4 \cdot 10^6$ Da and $8 \cdot 10^6$ Da. Although the preferred UHMWPE used in the present invention is homopolymeric or substantially homopolymeric, i.e. with only a low content of copolymerizable comonomers, the compositions may, as also indicated elsewhere herein, include conventional processing aids or property-modifying additives. Examples of the latter groups of components include, but are not limited to, components such as thermal stabilizers; UV stabilizers; nucleating and clarifying agents; dyes and pigments; electrically conducting materials such as metal powders, carbon powders, graphite and the like; fillers, for example non-reinforcing fillers having BET surface areas <50 m$^2$/g and reinforcing fillers such as fumed silica having surface areas $\geq$50 m$^2$/g; lamellar reinforcements such as mica, expanded shale, and the like; fibrous reinforcement in the form of chopped or otherwise attenuated fibers, for example glass fibers, ceramic fibers, aramid fibers, metal fibers, carbon fibers, thermoset and thermoplastic fibers such as those of polyimide, polyetherimide, polysulfone, polyethersulfone, polyether ketone (PEK) and its variants (PEKK, PEEK, etc.); tougheners such as particulate elastomers; other thermoplastics, such as non-UHMW PE; plasticizers, etc. The amounts of such additives is generally small.

Having described in detail individual components of the present invention, a preferred embodiment is a ram extrusion process employing a slit die having a width greater than 0.6 m and preferably having an aspect ratio of width to height greater than 10:1, more preferably greater than 20:1, and yet more preferably greater than 40:1, the die having a top portion and a bottom portion, each of the top and bottom portions containing a plurality of three and preferably at least five cooling zones positioned across the width of the die, the temperature of a plurality of zones in each set of zones being independently adjustable. The length of the cooling zone in the machine direction and the temperature of the zones are such that a UHMWPE panel exiting the die has cooled below its crystalline melt temperature and is at least partially crystalline.

In another preferred embodiment, a two piece die, the exit of which is not the shape of the desired cross-section of a ram extruded product when not under pressure, is contained within support structure of high strength and modulus which bears against the die halves and restrains their distortion outwards at the operating pressure of the ram extrusion process. However, under pressure, distortion which cannot be completely restrained by the support structure distorts the die and support structure in such a way that the die exit assumes a shape which allows the ram extrusion of panels of at least 0.6 m width and preferably of at least the aspect ratios previously described, the panel having variations in thickness of less than 0.050 inch (1.27 mm), preferably less than 0.030 inch (0.76 mm), and more preferably less than 0.015 inch (0.38 mm). The die has at least one cooling zone in each die half, proximate the die exit, such that the UHMWPE panel exiting the die is at a temperature below the crystalline melt temperature, preferably below 137° C., more preferably below 250° F. (121° C.), more preferably below 120° C., yet more preferably below 110° C., still more preferably in the range of 40 to 100° C., and most preferably between 75° C. and 85° C.

In a yet more preferred embodiment, the die of the foregoing embodiment has a small vertical taper or "narrowing" from the height of the die where the ram enters, to a somewhat uniform and narrower height along the machine direction towards the die exit. Also, in this preferred embodiment, the shape of the die transverse to the machine direction is such that the height of the die slit is less at the center of the slit than at the edges of the slit, and the support structure consists of heavy steel slabs machined to have substantially flat faces which bear against the respective die halves. The steel slabs are tensioned by a plurality of threaded connectors, most preferably by multi-jackbolt tensioners such as those available from Superbolt, Inc. Carnegie, Pa., and described in U.S. Pat. Nos. 6,263,764; 6,112,396; 6,381,827; 6,199,453; 5,083,889; and 4,846,614.

In a yet more preferred embodiment, the die of the foregoing embodiment is employed, and is also provided with a plurality of at least three cooling zones in each die half, as previously described. The temperatures of the various cooling zones are set to provide stable extrusion of the panel product, and are individually adjusted when necessary to counter process variations which produce warp, bow, surface irregularities, and thickness variations, these adjustments preferably being made during operation of the machine.

The product produced by the inventive process is a novel product whose manufacture was not possible prior to the present invention. As indicated previously, due to the difficulties of ram extrusion, it had been impossible to ram extrude constant thickness panels of large width and high aspect ratio, i.e. thin panels. Thus, to produce thin panels, thick, compression molded panels were skived to produce thin sheets. However, these sheets have irregular surfaces, both in terms of thickness variation as well as appearance.

Panels produced by the subject invention process are characterized by a smooth, glossy, and uniform surface. The smoothness can be assessed easily by touch, and the gloss of the surface assessed visually, or by optical inspection techniques such as the standard ASTM D2457-03 and D523-89 test methods, preferably at a 60° angle. Using this test methodology, employing a BYK Gardner Color Guide Glass Meter supplied by BYK Gardner U.S.A., Columbia, Md. and a 60° test angle, average gloss measurements preferably range from 35 upwards, with most panels in the range of 35 to 45. This is in contrast to skived panels which, although also smooth, have significantly lower gloss, averaging about 24 using the same test methodology.

The uniform surface has a 3$\sigma$ thickness variation of less than ±0.050 inch (±1.25 mm), more preferably within ±0.030 inch (±0.76 mm), and yet more preferably within ±0.020 inch (±0.50 mm). While the surface is smooth and glossy, it can further be distinguished from skived panels by the presence of shot marks substantially perpendicular to the length of the sheet (in the machine direction) and substantially parallel to each other. These shot marks are believed to be caused by the stationary dwell between ram extrusion cycles, and the profile and height of the shot marks can be measured by standard profilometry techniques. The shot marks have a maximum height (top to bottom) of only several microns, i.e. less than 70 μm, more preferably less than 25 μm, and importantly, do not interfere with known uses of thin panel stock. Products have been produced over extended trials with shot marks measuring about 5-10 μm in height. The shot marks may easily be seen by observing the panel at an oblique angle.

Figure 10A:
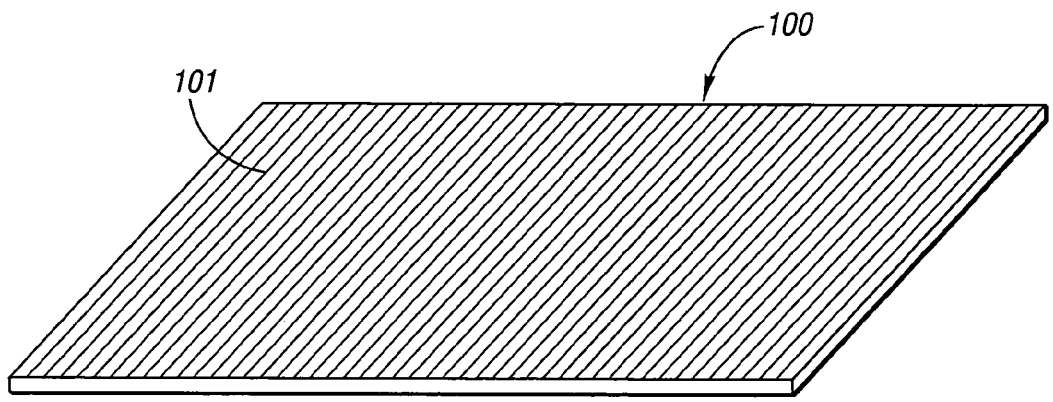
FIG. 10a-10c illustrate three embodiments of shot marks in the UHMWPE panels of the invention.
Figure 10B:
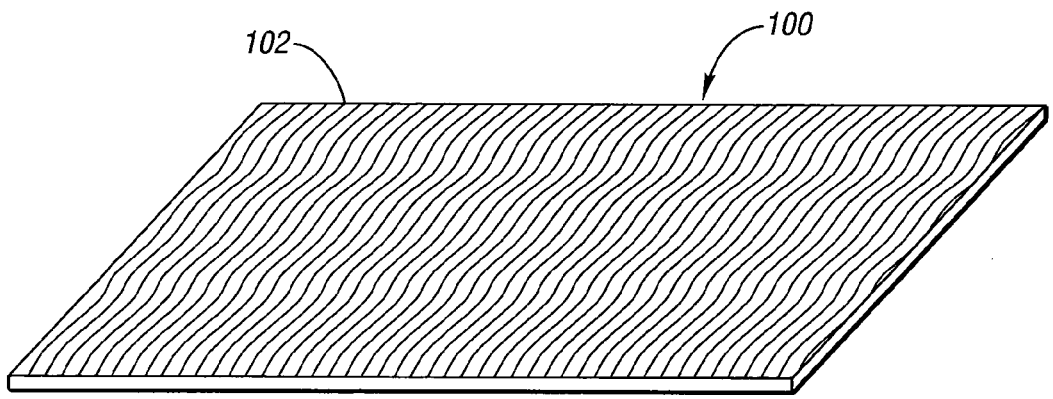

FIGS. 10$a$-10$c$ illustrates several shot mark patterns. In FIG. 10$a$, an "ideal" shot mark pattern is shown, where the delimiting edges 101 of shot marks are exactly parallel to each other and perpendicular to the machine direction in panel 100. This type of pattern would result if the UHMWPE in the die all flowed at exactly the same rate, experienced the same back pressure, etc., and these parameters did not change over the length of the panel.

Figure 10C:
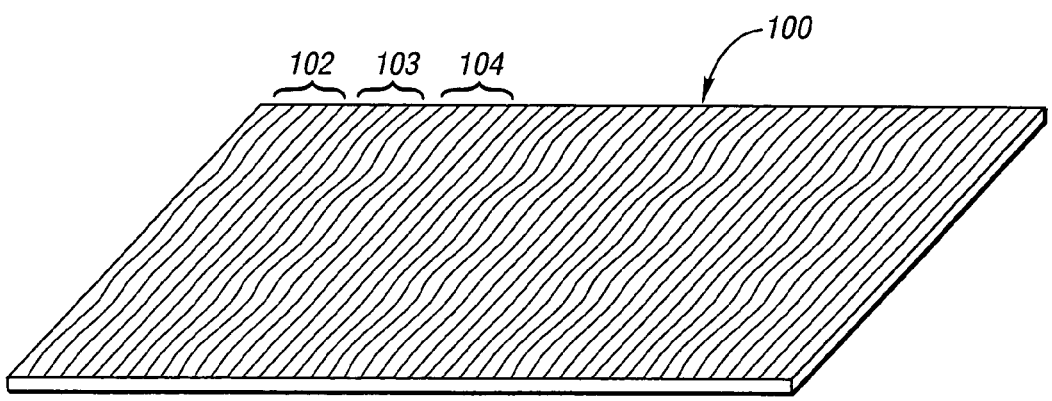

However, the flow of UHMWPE is generally retarded somewhat at the edges of the die, and may experience less retardation at the die center. The retardation at the two edges may not be the same either. The result is that the shot marks are typically somewhat "wavy" or "undulating" across the panel surfaces (shot marks are on both front and back surfaces) as shown at 102 in FIG. 10b. The generally perpendicular orientation to the machine direction is clear, as is also the generally parallel orientation with respect to adjacent shot marks. In FIG. 10c is shown a similar panel but one in which the shot marks change their respective orientation along the panel, initially at 102 being the same as in FIG. 10b, departing somewhat over portion 103, and becoming similar again over portion 104. The shot marks are still substantially perpendicular to the machine direction and substantially parallel to each other.

Thus, the present invention also pertains to an UHMWPE panel having a width greater than 0.6 m, and characterized by generally parallel shot marks on both top and bottom surfaces. For panels whose length direction corresponds to the machine direction, these shot marks are transverse to the machine direction of the panel. The surface of the panels are smooth and glossy, and have a thickness tolerance as previously described. Preferred panels are from 4 mm to 10 cm in thickness, more preferably less than 2 cm thick. Preferred panels have a global flatness variation of less than 0.150 inch (3.8 mm; 3σ) with a tolerance of ±0.030 inch (0.8 mm; 3σ), and preferably a global flatness variation of less than 0.100 inch (2.5 mm) with a tolerance of less than ±0.024 inch (0.6 mm; 3σ). The sideways bow (curvature) of the panels, without trimming, is preferably within approximately the same values as the global flatness. It should be noted that these sideways bow tolerances for the panel as extruded, are superior than that which can ordinarily be obtained by conventional sawing of the edge. Thus, it is preferred that the subject invention panels retain their edges "as produced", and are not sawn.

Having generally described this invention, a further understanding can be obtained by reference to certain specific examples which are provided herein for purposes of illustration only and are not intended to be limiting unless otherwise specified.

Example 1

A ram extrusion machine is provided having a stainless steel die composed of two halves, substantially as described herein, as illustrated, for example, by FIGS. 2, 3, and 4. The die has a length in the machine direction of 81.25 cm, a width of 172 cm, and a height of 96.5 cm. The bottom die half is similar to the top half but does not contain any passageways 47 for entry of UHMWPE powder, and has edges configured to mate with those of the top half. The die is vertically tapered in the machine direction from the ram entry by about 3°, and the geometry of the slit is generally circular with a very long radius, ca. 375 m. The hot zone of the die is maintained at 440° F.±20° F. (227° C.±11° C.), and the die exit end is provided with five cooling zones on each die half, extending approximately 3 inches (7.6 cm) into the die in the machine direction.

The die is contained within a support structure consisting of two flat surfaced carbon steel billets measuring 68 in. (1.7 m) by 15 in. (0.38 m) by 22.5 in. (0.58 m), which are tensioned by 5 multi-jackbolt tensioners having a bolt diameter of 2 in. (5 cm). The steel billets are positioned over the die about one inch from the exit end and extending from that point toward the ram entry end of the die, as illustrated in FIG. 2.

UHMWPE resin powder 6540 from Braskem, Sao Paulo, Brazil, having a melt temperature of 133° C., an average particle size (D50) of 190 µm, and an average molecular weight of $8 \times 10^6$ g/mol is introduced pneumatically into a hopper above the UHMWPE entry ports in the top die half. A flow of nitrogen is introduced into the hopper near the bottom to remove air from the resin powder. The ram is drawn back and resin powder is allowed to fill the die cavity below the hopper. The ram then enters the die and compresses the resin powder and pushes it into the vertically tapered portion of the die, this resin in turn pushing the previous portion of resin powder, which has now been heated to a gel, towards the die exit. The ram dwells at this position for approximately 1 second, and then the cycle is repeated. At the beginning of each cycle, once the die is full, 0.5 inch (12.5 mm) of length of an UHMWPE panel of 0.375 inch (9.5 mm) thickness and width of 4 feet (1.22 m) exits the die. The panel is partially restrained in movement by a cloth covered back pressure device which facilitates continued contact of the cool (250° F.) panel with the walls of the die. The back pressure device is constructed so as to allow for variations in back pressure across the width of the panel. The panel is taken up on a flat conveyor, and the operator adjusts the cooling zone temperatures to remove warp and bow from the panel. The top and bottom cooling zone temperatures at stable, flat panel production, are [42° C., 56° C., 60° C., 49° C., 43° C.] and [42° C., 49° C., 53° C., 44° C., 41° C.] respectively. The panel exits the die at a temperature below 100° C., much lower than the crystalline melt temperature. The flat panels produced are cut to length, and have a glossy flat surface with a thickness variation of less than 0.030 inch. Mold "shot marks" of a length equivalent to each ram stroke's production can be seen if observed carefully at a high angle of incidence, but are virtually invisible when viewed head on. The panel has slightly rounded edges which are uniform from panel to panel, and is of commercial quality.

Example 2

The same machine and process are used as in Example 1, but the die has in addition to the vertical taper, non-parallel exit faces having dual side tapers and a curvilinear top section, as described in FIG. 7. The top cooling zones are all set to 76.7° C. and the bottom zones all set to 73.9° F. Very little adjustment is required during operation. The extruded panel exits the die at approximately 79° C. A flat panel of even higher quality than Example 1 in terms of thickness variation and edge consistency is produced. The production rate is 5.8 m/hour (19 feet/hr, or 71.4 kg/hour (160 lb/hr).

Comparative Example 1

A commercial press molding operation is employed, employing a large, thick section coffin-like mold. UHWMPE resin powder is introduced into the mold cavity and a close fitting top inserted into the mold. The mold and three other molds of similar size are loaded into a stack, placed under a pressure of 1000 lb/in², (6.9 MPa) and heated to above the crystalline melt temperature, held at this temperature for 90 minutes, and then slowly allowed to cool. Thick plaques are obtained from which 0.375 inch (0.95 cm) thick panels can be produced by skiving in a separate step. Prior to skiving, the production rate is 75 lbs/hour (33.5 Kg/hr). Following skiving, a long anneal time at elevated temperature is required to reduce end curl and edge curl and internal stresses.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A ram extruded UHMWPE panel having a width of 0.6 m or greater, a thickness variation of less than 1.27 mm (3σ), and smooth, glossy top and bottom surfaces, both top and bottom surfaces having a plurality of substantially parallel, visually observable shot marks with an average height of about 70 μm or less.

2. The panel of claim 1, having no sawn edges.

3. The panel of claim 1, wherein said thickness variation is 0.8 mm or less.

4. The panel of claim 1, wherein the average height of the shot marks is less than 25 μm.

5. The panel of claim 3, wherein the maximum average height of the shot marks is less than 25 μm.

6. The panel of claim 1, wherein an average thickness of the panel is between 4 mm and 2 cm.

7. The panel of claim 1, which has a width of from 1.0 m to 3.0 m.

8. The panel of claim 1, which has an average 60° specular gloss of 35 or greater when measured in accordance with ASTM D2457.

9. The panel of claim 1, produced by a ram extrusion process, comprising:
    providing a slit die which has a substantially rectangular cross-section under ram extrusion operating pressure, the die having a top portion and a bottom portion and an inlet face and an exit face, and having at least three independently controllable cooling zones in each of the top portion and bottom portion, said cooling zones located proximate the exit face of the die, and positioned across the width of the die;
    incrementally introducing UHMWPE resin particles into the die under pressure from a ram;
    heating the UHMWPE particles to a temperature above the crystalline melt temperature of UHMWPE to form a substantially continuous molten thermoplastic;
    cooling the UHMWPE to a temperature below the crystalline melt temperature while within the die and while maintaining contact with the walls of the die; and
    obtaining a solidified UHMWPE panel product which has exited the die.

10. The panel of claim 9, wherein the panel is cooled to a temperature in the range of 40° C. to 100° C. prior to exiting the die.

11. The panel of claim 9, wherein said die, when not under ram extrusion pressure, has a cross-section wherein the height of the slit at positions transverse to the machine direction, exceed 0.030 above or below the average height of the slit.

12. The panel of claim 1, said panel having a thickness variation of 0.76 mm or less (3σ), a 60° specular gloss measured by ASTM D-2457 of 35 or more, and shot marks having an average height of less than 25 μm.

13. The panel of claim 12, which has a width of 1.0 m to 3.0 m, and an average thickness of 4 mm to 7 cm.

14. The panel of claim 12, which has a width of 1.0 m to 3.0 m, and an average thickness of 4 mm to 4 cm.

15. The panel of claim 14, wherein a central flat portion of the panel comprises 90% or more of the area of the panel.

16. The panel of claim 1, wherein said ram extrusion causes said panel to be characterized by the presence of shot marks having an average height of from 10-15 μm, a 60° specular gloss of 35 or more when measured by ASTM D-2457, a thickness variation of 0.76 mm total, a global flatness of less than 2.5 mm±0.6 mm (3σ), and a width greater than 1 m.

17. The panel of claim 9, wherein said ram extrusion causes said panel to be characterized by the presence of shot marks having an average height of from 10-15 μm, a 60° specular gloss of 35 or more when measured by ASTM D-2457, a thickness variation of 0.76 mm total, a global flatness of less than 2.5 mm±0.6 mm (3σ), and a width greater than 1 m.

18. The panel of claim 9, wherein the temperature of the panel upon exit from the die is below 121° C.

19. The panel of claim 9, wherein the temperature of the panel upon exit from the die is below 110° C.

20. The panel of claim 9, wherein the temperature of the panel upon exit from the die is between 40° C. and 100° C.

21. The panel of claim 1, which has a specular gloss as measured by ASTM D2457-03 of 35 or greater.

22. The panel of claim 1, wherein the shot marks have an average height of from 10 μm to less than 25 μm.

23. The panel of claim 1, wherein the shot marks have an average height of from 5 μm to 10 μm.

* * * * *